United States Patent [19]

Watanabe et al.

[11] Patent Number: 4,585,717
[45] Date of Patent: Apr. 29, 1986

[54] ORGANIC BATTERY

[75] Inventors: Atsushi Watanabe, Toyokawa; Hiromochi Muramatsu, Nagoya, both of Japan

[73] Assignee: Nippondenso Co., Ltd., Kariya, Japan

[21] Appl. No.: 716,613

[22] Filed: Mar. 28, 1985

Related U.S. Application Data

[63] Continuation of Ser. No. 513,395, Sep. 12, 1983, abandoned.

[30] Foreign Application Priority Data

Sep. 14, 1982 [JP] Japan ................................. 57-158921

[51] Int. Cl.$^4$ .......................................... H01M 4/60
[52] U.S. Cl. .................................... 429/213; 429/218
[58] Field of Search ................................ 429/213, 218

[56] References Cited

U.S. PATENT DOCUMENTS

| | | | |
|---|---|---|---|
| 4,263,382 | 4/1981 | Louzos et al. | 429/213 |
| 4,315,975 | 2/1982 | Sekido et al. | 429/213 X |
| 4,321,114 | 3/1982 | MacDiarmid et al. | 204/2.1 |
| 4,327,160 | 4/1982 | Jones et al. | 429/213 X |
| 4,333,996 | 6/1982 | Louzos | 429/213 X |
| 4,397,922 | 8/1983 | Pohhodenko | 429/213 X |

Primary Examiner—Charles F. Lefevour
Attorney, Agent, or Firm—Cushman, Darby & Cushman

[57] ABSTRACT

An electroconductive macromolecular film having an increased overall sectional area is used as organic polymer electrode to improve the charging and discharging efficiency of the organic polymer batteries.

3 Claims, 6 Drawing Figures

TOTAL CIRCUMFERENTIAL LENGTH OF $(CH)_x$ FILMS

ORGANIC BATTERY

CROSS REFERENCE TO RELATED APPLICATIONS

This application is a continuation of our earlier application, Ser. No. 513,395, filed Sept. 12, 1983, now abandoned.

This invention relates to an organic polymer battery using an electroconductive macromolecular film as an electrode material, especially to an electrode for such an organic battery.

This invention is aimed at improving the charging and discharging efficiency of organic batteries.

The electroconductive macromolecular film used for the organic batteries is usually a polyacetylene (CH)x film, and it is conceivable that the charging and discharging efficiency of the battery would be enhanced by enlarging the film surface area of the polyacetylene (CH)x electrode in the battery. However, the practical experiments disclosed that the enlargement of the (CH)x film surface area rather lowers the charging efficiency and renders the battery unable to attain sufficient charging. In an effort to prevent the charging and discharging efficiency from being lowered by the enlargement of the (CH)x film surface area, the shape of the electrode was modified in various ways and the dopant concentration in each case was determined. The dopant concentration can be a measure of the charging and discharging efficiency of the battery.

The present invention will be described below in detail with reference to the accompanying drawings, in which.

Figure 1:
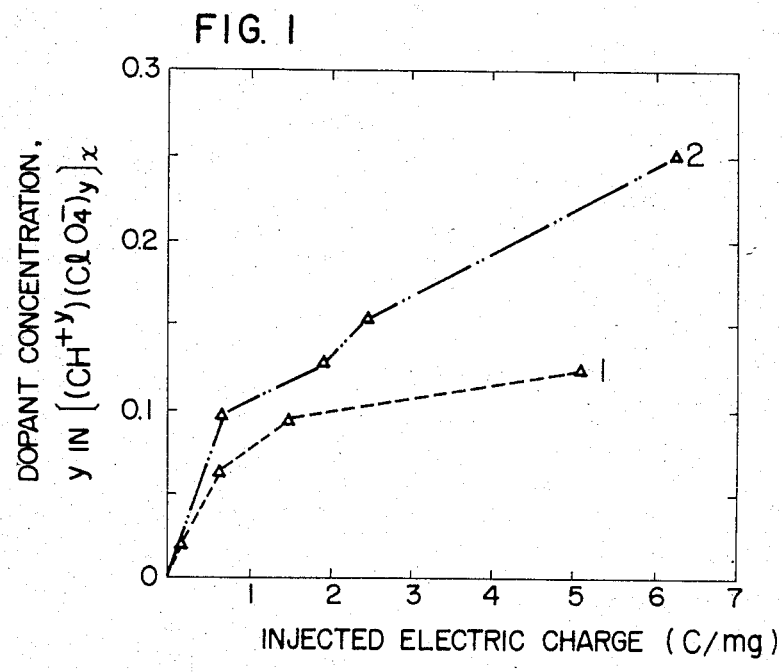
FIG. 1 is a graph showing the change of dopant concentration in a polyacetylene electrode in accordance with the injected electric charge.

Referring to FIG. 1, there is shown a pattern of change of dopant concentration for a single piece of (CH)x film having a surface area of 8 cm² (curve 1) and in case of using four pieces of film having a surface area of 2 cm² (curve 2)(the 8 cm² film was divided into four portions). In the graph, the injected electric charge (C/mg) is plotted as the abscissa and the dopant concentration, or y in $[(CH^{+y})(ClO_4^-)_y]_x$ as the ordinate. A higher dopant concentration signifies a higher charging efficiency. As seen from the graph, the dopant concentration was higher when the film, 8 cm² in surface area, was used by dividing it into four equal portions than when such film was used in a single form, and thus, in the former case, the charging efficiency was better and the dopant concentration in the (CH)x film electrode was almost doubled when the injected electric charge was 5 C/mg. It was also found that this trend of dopant concentration well resembled that which was observed when the similar experiment was conducted by using a single 2 cm² (CH)x film.

Figure 2:
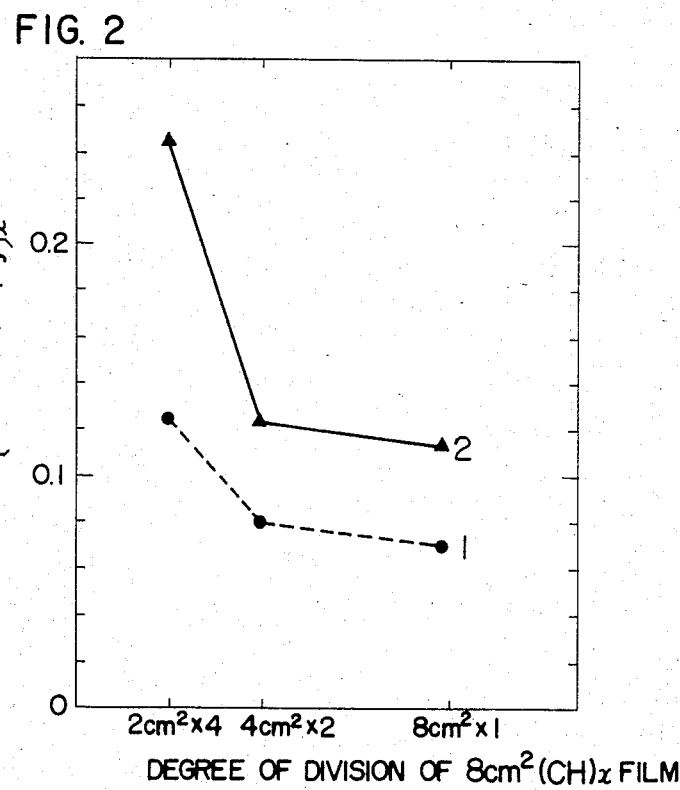
FIG. 2 is a graph showing the change of dopant concentration in a polyacetylene electrode in accordance with the degree of division of the polyacetylene film.

FIG. 2 shows the change of dopant concentration in the film according to the degree of division of an 8 cm² (CH)x film when the injected electric charge is 5 C/mg (curve 1) and 15 C/mg (curve 2). In the graph, the degree of division of the (CH)x film is plotted as abscissa and the dopant concentration in the film, that is y in $[(CH^{+y})(ClO_4^-)_y]_x$, as the ordinate. As seen from the graph, the more the (CH)x film is divided, the higher the dopant concentration and hence the better the charging efficiency. This can be well accounted for by the increase of the sectional area of the (CH)x film.

Figure 3:
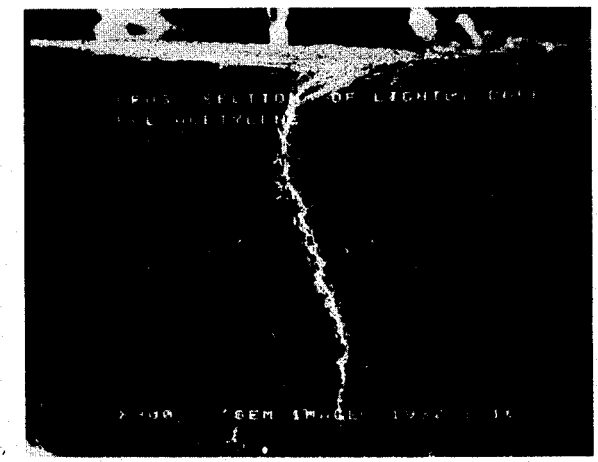
FIG. 3 is a scanning electron photomicrograph (900 times magnified) of a section of a polyacetylene film slightly doped with $ClO_4^-$, intended to show the fiber configuration in the film.

FIG. 3 is a scanning electron micrographic (SEM) photograph (900 times magnified) of a section of the (CH)x film which has been doped with a small quantity of $ClO_4^-$. This photograph shows that the fibers in the (CH)x film are less dense in the inside (sectioned area) than in the surface, so that it is considered that the dopant passes through the inside section more easily where the fibers are sparse than through the surface portion where the fibers are packed so densely that no individual (CH)x fibers can be recognized. This photograph clearly shows a state where the dopant has penetrated along a pinhole formed by chance, doping its surrounding area alone.

Figure 6:
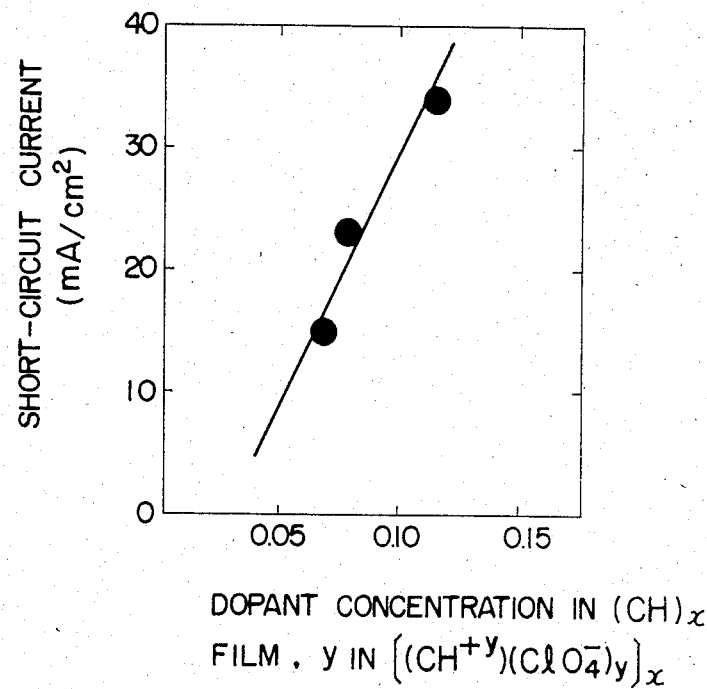
FIG. 6 is a graph showing the relationship between the dopant concentration in the film and the quantity of short circuit current.

It could be also experimentally determined that a large amount of current can be obtained by dividing the (CH)x film not only at the time of charging but also at the time of discharging as shown in FIG. 6. This probably will be because the more sparse the fibers in the film, the more rapid becomes the dopant movement as at the occasion of charging.

The foregoing facts dictate that in order to enhance the charging and discharging efficiency of a polymer battery, one needs to enlarge the overall sectional area of the (CH)x film as much as it can be.

The present invention provides an organic battery characterized by using an electroconductive macromolecular film having an increased overall sectional area as an organic polymer electrode.

The effective means for realizing a desired increase of the overall sectional area of the macromolecular ((CH)x) film is to make as many cuts or to form as many fine pores in the film as possible. By so doing, even a battery using a small (CH)x film will be provided with a high energy density as well as a high output density, and thus it becomes possible to make a compact high-performance battery.

Figure 4:
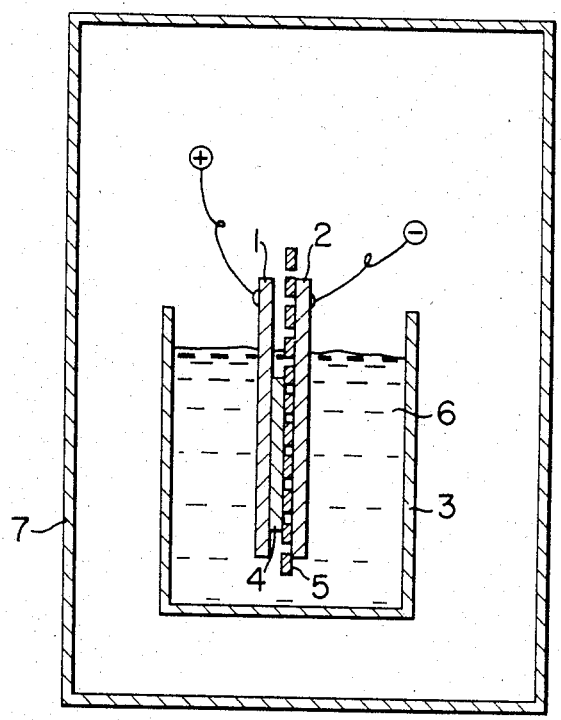
FIG. 4 is a diagrammatic illustration of the structure of an organic battery according to this invention.

The organic polymer battery of this invention will be described with particular reference to FIG. 4. In the drawing, reference numerals 1 and 2 designate a pair of electrodes and 3 a battery case. This battery case 3 is for instance made of stainless steel. Numeral 4 refers to an organic polymer electrode which is formed from an organic electroconductive material, for example, a polyacetylene film. 5 denotes a separator formed, for example, from a non-woven fabric of polypropylene. Designated by numeral 6 is the electrolyte prepared, for instance, by dissolving $LiClO_4$ in propylene carbonate in a concentration of 1 mol/dm³. 7 indicates a dry box in which the present experiment was carried out.

In case of forming a sheet-like battery, a four-layer laminate film formed by sandwiching aluminum foil between polyester resin films and laminating a heat-sensitive adhesive film to the inside of the battery may be used as the battery case 3. The electrode 4 can be made of any organic electroconductive material which includes, beside polyacetylene mentioned above, polypyrrole, poly-p-phenylene, poly-p-phenylene sulfide and the like. For the separator 5, a polyamide non-woven fabric may be used as well as a polypropylene non-woven fabric. As the base material of the electrolyte 6, there may be used, beside $LiClO_4$ mentioned above, $LiBF_4$, $(n-Bu)_4NClO_4$, $(n-Bu)_4NPF_6$, $(C_2H_5)_4NClO_4$, $(CH_3)_4NClO_4$ and the like. As the solvent therefor, one may use, beside above-mentioned propylene carbonate, other polar non-protonic organic solvents such as dimethyl sulfoxide, acetonitrile, dimethylamide, γ-butyrolactone, tetrahydrofuran, 1,2-dimethoxyethane and the like either singly or in admixture.

EXAMPLE 1

A (CH)x film (20×40×0.15 mm)(8 $cm^2$×1) was sandwiched between two sheets of platinum plate and contact bonded through a polypropylene separator, and the laminate was placed in a glass vessel. Commercial propylene carbonate of reagent grade was treated by molecular sieves for a whole day and night, then dried and vacuum distilled on $CaH_2$. To the thus treated propylene carbonate was added $LiClO_4$ to a concentration of 1 $mol/dm^3$ to prepare an organic electrolyte.

This organic electrolyte was poured into said battery cell and the latter was evacuated under reduced pressure and sealed. All of the above-said operations were carried out under an inert gas atmosphere. The thus constructed battery was charged to a quantity of electricity of 4 $C/cm^2$ with a charging current of 10 mA at room temperature, and then the (CH)x electrode was taken out, washed with propylene carbonate and acetone and vacuum dried, and the dopant concentration in the (CH)x film was measured from the change of weight of the film, finding that the dopant concentration $y = 0.068$.

The same experiment was conducted on the battery where two pieces of (CH)x film (20×20×0.15 mm) (4 $cm^2$ ×2) were used. In this case, the dopant concentration (y) in the film after 4 $C/cm^2$ charging was 0.078.

In case four pieces of (CH)x film (20×10×0.15 mm) (2 $cm^2$×4) were used, the dopant concentration (y) in the film after 4 $C/cm^2$ charging was given as $y = 0.114$.

Figure 5:
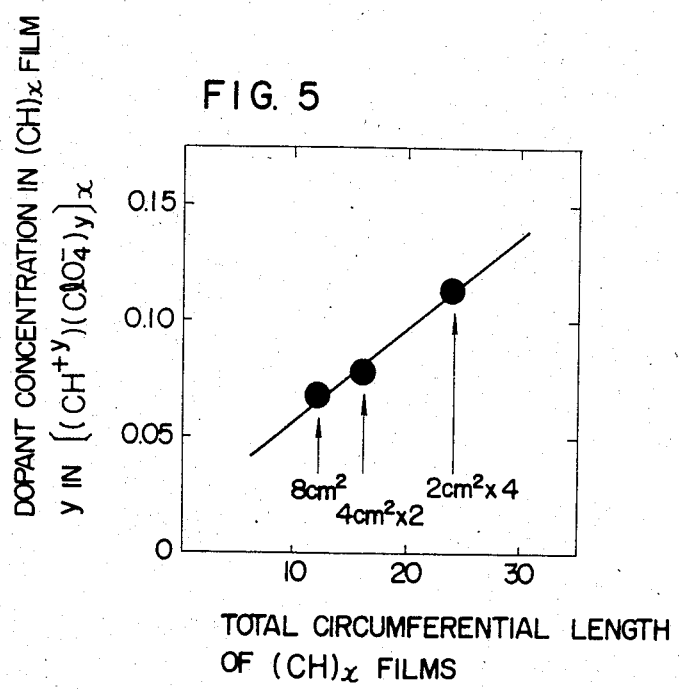
FIG. 5 is a graph showing the change of dopant concentration in the film in accordance with the total circumferential length (cm) of the (CH)x film(s).

FIG. 5 illustrates the plots of these dopant concentrations in the film against the total circumferential length of the (CH)x film(s), which shows that there exists a linear relationship between said dopant concentration and the total circumferential length of the film. In the graph of FIG. 5, the total circumferential length (cm) of the (CH)x film(s) is plotted as the abscissa and the dopant concentration in the film, or y in $[(CH^{+y})(ClO_4^-)_y]_x$, as the ordinate.

EXAMPLE 2

A (CH)x film (20×40×0.15 mm) (8 $cm^2$×1) was sandwiched between two sheets of platinum plate and contact bonded through a propylene separator, and the laminate was placed in a glass vessel. Commercial propylene carbonate of reagent grade was treated by molecular sieves for a whole day and night, then dried and vacuum distilled on $CaH_2$, and to this propylene carbonate was added $LiClO_4$ to a concentration of 1 $mol/dm^3$ to prepare an organic electrolyte.

This organic electrolyte was supplied into said battery cell and then the latter was evacuated under reduced pressure and sealed. All of these operations were carried out under an inert gas atmosphere. The thus constructed battery was once charged to a quantity of electricity of 4 $C/cm^2$ with a charging current of 10 mA at room temperature and then the battery was discharged and the short-circuit current (Isc) was measured, finding that $Isc = 15$ $mA/cm^2$. When the same experiment was conducted on the battery where two pieces of (CH)x film (20×20×0.15 mm) (4 $cm^2$×2) were used, the short-circuit current (Isc) was 23 $mA/cm^2$, and in case four pieces of (CH)x film (20×10×0.15 mm) (2 $cm^2$×4) were used, $Isc = 34$ $mA/cm^2$.

Plotting of the short-circuit currents determined in Example 2 against the dopant concentrations in the film after 4 $C/cm^2$ charging as determined in Example 1 is illustrated in FIG. 6, which shows that there exists a linear relationship between said short-circuit current and dopant concentration. In the graph of FIG. 6, the dopant concentration in the (CH)x film electrode, or y in $[(CH^{+y})(ClO_4^-)_y]_x$ is plotted as the abscissa and the short-circuit current ($mA/cm^2$) as the ordinate. The straight line shows the change of short-circuit current when the amount of injected change was 4 $C/cm^2$.

What is claimed is:

1. An organic polymer battery having an improved charging/discharging efficiency, said battery comprising:
    a cathode and an anode as electrodes, at least one of which has as the electrode active material an electroconductive macromolecular film having fibers distributed throughout, the fibers on the film's surfaces being denser than in the inside of the film;
    a separator positioned between said anode and said cathode;
    an organic electrolyte containing a dopant in a polar non-protic organic solvent; and
    a vessel containing said electrodes and said electrolyte and adapted to maintain same under reduced pressure in an inert atmosphere,
    said electroconductive macromolecular film having a plurality of cuts or through-holes to increase an inside section to facilitate passage of said dopant through said inside section where there are fewer fibers than on the surface portion of the film.

2. The organic polymer battery as claimed in claim 1, in which the electroconductive macromolecular film is polyacetylene film.

3. The organic polymer battery of claim 1, in which the fibers of the electroconductive macromolecular film are less dense in the center of the film than in the surface.

* * * * *

UNITED STATES PATENT AND TRADEMARK OFFICE
CERTIFICATE OF CORRECTION

PATENT NO.   :   4,585,717
DATED        :   April 29, 1986
INVENTOR(S)  :   WATANABE et al It is certified that error appears in the above-identified patent and that said Letters Patent is hereby corrected as shown below:

Title Page, Item [63] delete "513,395" and insert--531,395--.

Column 1, line 7, delete "513,395" and insert--531,395--.

Signed and Sealed this
Eighteenth Day of November, 1986

*Attest:*

DONALD J. QUIGG

*Attesting Officer*          *Commissioner of Patents and Trademarks*